(12) United States Patent
Letourneur

(10) Patent No.: US 9,406,277 B1
(45) Date of Patent: Aug. 2, 2016

(54) CONTROL OF SPECTRAL RANGE INTENSITY IN MEDIA DEVICES

(71) Applicant: AMAZON TECHNOLOGIES, INC., Reno, NV (US)

(72) Inventor: Hervé Jacques Clément Letourneur, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 77 days.

(21) Appl. No.: 13/904,955

(22) Filed: May 29, 2013

(51) Int. Cl.
*G09G 5/10* (2006.01)

(52) U.S. Cl.
CPC .......................................... *G09G 5/10* (2013.01)

(58) Field of Classification Search
None
See application file for complete search history.

(56) References Cited

U.S. PATENT DOCUMENTS

| | | | | |
|---|---|---|---|---|
| 2006/0152525 | A1* | 7/2006 | Woog | 345/589 |
| 2009/0172430 | A1* | 7/2009 | Takenouchi | 713/310 |
| 2009/0278828 | A1* | 11/2009 | Fletcher et al. | 345/207 |
| 2009/0287433 | A1* | 11/2009 | Houston et al. | 702/62 |
| 2010/0264850 | A1 | 10/2010 | Yamamoto et al. | |
| 2011/0037781 | A1* | 2/2011 | Kangas et al. | 345/690 |
| 2011/0080421 | A1* | 4/2011 | Capener | 345/589 |
| 2011/0185205 | A1* | 7/2011 | You et al. | 713/320 |
| 2011/0227966 | A1* | 9/2011 | Mori | 345/690 |
| 2011/0260958 | A1* | 10/2011 | Shabel et al. | 345/102 |
| 2011/0261308 | A1* | 10/2011 | Kurokawa et al. | 349/138 |
| 2012/0218282 | A1* | 8/2012 | Choboter et al. | 345/589 |
| 2013/0073449 | A1* | 3/2013 | Voynow et al. | 705/39 |
| 2014/0063853 | A1* | 3/2014 | Nichol et al. | 362/616 |

OTHER PUBLICATIONS

"F.lux", Wikipedia: The Free Encyclopedia, Wikimedia Foundation, Inc., [retrieved on Aug. 16, 2013], [date last updated Aug. 12, 2013], Retrieved from the Internet: <URL: http://en.wikipedia.org/wiki/F.lux>.

* cited by examiner

*Primary Examiner* — Adam R Giesy
*Assistant Examiner* — Henok Heyi
(74) *Attorney, Agent, or Firm* — Lindauer Law PLLC

(57) ABSTRACT

Illumination of a display is controlled so as to modulate the intensity of emissions in one or more spectral ranges over time while content is being presented. Usage data indicative of user interaction with the presented content or previously presented content can be used to generate or modify a pattern profile. The pattern profile is used to control light emitters of a media device. Various operating modes respectively directed to decreasing or increasing intensity over time within certain portions of the visible spectrum can be used during the presentation of written, video or other content.

20 Claims, 11 Drawing Sheets

CONTROL OF SPECTRAL RANGE INTENSITY IN MEDIA DEVICES

BACKGROUND

A wide variety of media devices are used to view written content, video presentations, and the like. Examples of such media devices include electronic book readers ("eBook readers"), tablet computers, smartphones, medical devices, in-vehicle systems, wearable computers, and other equipment. Users employ such media devices under differing circumstances including business or industrial settings, while traveling on mass transit, within academic classrooms, and within their homes and other personal environments.

Figure 1:
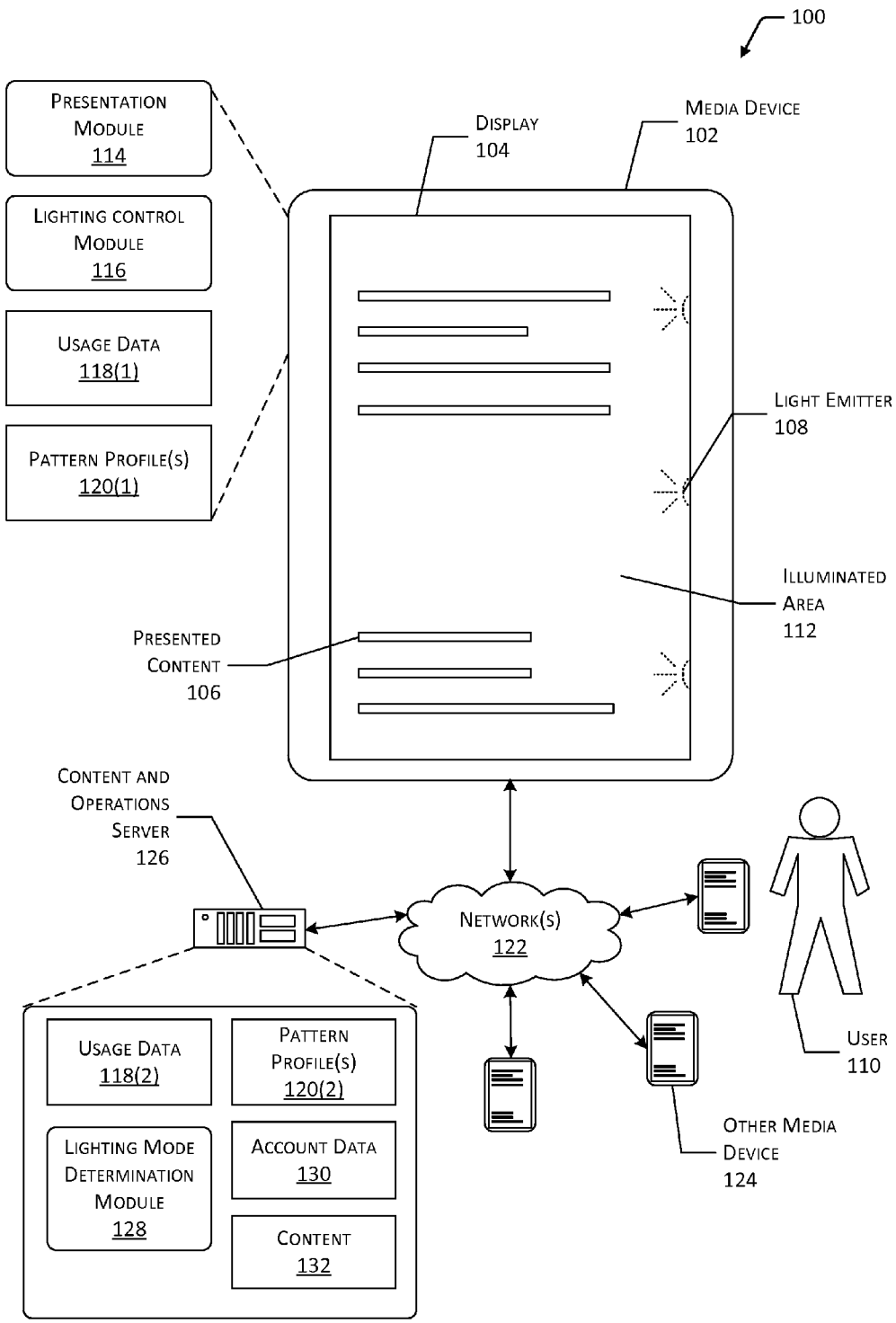
FIG. 1 is a block diagram of a system including media devices and a content and operations server that communicate with each other via a network or networks.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Media devices allow users to view written, video, and other visual/audio content by way of electronic apparatus. The electronic apparatus may include a display used to present viewable content to a user. Touch-sensitive controls of the display or other user inputs allow the user to control consumption of the content. For example, the user may activate controls to move forward or backward through written content (such as by the turning of virtual pages), initiate playback of video content, halt such playback, adjust sound volume, and so on.

The displays may be constructed using backlit displays, front-lit displays, emissive pixel displays, or other suitable constructs. Light emitters used in these various contexts can include light-emitting diodes (LEDs), quantum dots, and so on. Other suitable illumination resources can also be used. In implementations using backlit or front-lit displays, a light distribution element such as a light guide formed as a sheet can be used to spread light from the light emitter or emitters uniformly over (or behind) the presentation area of the display. The result is that a user can view the presented content in situations having little or no ambient lighting.

The light emitters can be controlled to modulate intensity of spectral content of emitted light at one or more ranges of wavelengths. For example, red-green-blue (RGB) LEDs have respective diodes corresponding to different regions of the visual spectrum and these diodes may be individually electrically biased or driven to provide a particular overall emission color as desired. Spectral content of the light emitters in the green and blue wavelengths, for example, may be selectively increased or decreased.

Research into the nature of human sleep suggests that there is a relationship between the color content of light viewed by a person and the secretion of melatonin in the brain. Melatonin is a hormone which participates in regulation of sleep-wake cycles and the overall circadian rhythm of mammals, including humans. In particular, the secretion of melatonin may result in drowsiness and lower body temperature. Studies have shown that light in the blue region of the visible spectrum affects melatonin secretion or uptake, and thus can inhibit the onset of sleep. Of particular interest is light in the spectral range of 400 nanometers to 550 nanometers, with light at 484 nanometers perhaps being the wavelength of greatest effect on melatonin. Other ranges within the visible spectrum can also be of interest.

Users of media devices view many types of content under countless situations. In one illustrative scenario, a user is reading a novel or other text prior to going to sleep. It is desirable to such a user to aid the natural onset of drowsiness and to fall asleep without undue difficulty. In another illustrative scenario, a user is reviewing a training video having several key learning objectives. Such a user wishes to remain alert and have good retention of the material covered in the presentation, even though viewing the video at a late hour. Therefore, it is desirable to control the resources of a media device to aid such users in their respective goals.

In one example, a media device controls its illumination resources so as to reduce light intensity within a spectral range of interest (e.g., including blue light) over time while content is being presented on a display. Such a reduction of intensity is performed according to a pattern profile (i.e., a time-dependent intensity modulation function), and is directed to helping a user fall asleep normally (or at least, not inhibit such sleep). In another example, a media device increases light intensity within the spectral range over time while content is being presented. Such an increase in intensity is performed according to a pattern profile, and is directed to aiding a user in remaining awake and attentive.

Usage data, both previously acquired and real-time, can be used by a processor or controller of a media device to define or select a pattern profile, or to modify a pattern profile in use while content is being presented. The usage data may be acquired from the media device, from other media devices, or from other devices providing services to one or more media devices. Illustrative usage data can include, without limitation, content viewing times, content viewing quantities, content types, user rates of viewing content, rates at which a user is turning virtual pages, user backtracking or rewinding within content, or other characteristics of interaction with content.

Usage data from one or more media devices or other devices can be communicated to one or more servers configured to perform various analytical operations on the usage data. These analytical operations may include averaging, bin sorting, outlier filtering, and so forth, which are configured to address different media device user goals. Based on output from the analytical operations, pattern profiles may be generated or modified. The pattern profiles, processed usage data, or both, may be communicated back to the media devices for use during operations.

A pattern profile can include linear ramping (increasing or decreasing), one or more dwell periods, non-linear time-dependent portions, or other characteristics. Thus, a pattern profile can describe a simple linear transition, or a relatively complex piece-wise construct of various functions. Each pattern profile is used by a lighting control module to control light intensity within a spectral range over time between an initial magnitude and a terminal magnitude. Thus, various goals such as maintaining user wakefulness or aiding user restfulness may be aided by controlling spectral emissions from a media device while a user is viewing content thereon.

FIG. 1 depicts views 100 of an illustrative system. An exterior view of a media device 102, such as an e-reader device configured to present electronic books ("e-books") or other content, is depicted. The media device 102 includes a display 104. The media device 102 is configured to present content 106 to a user by way of the display 104. Non-limiting examples of the display 104 include a liquid-crystal display (LCD), an electrophoretic display, an emissive pixel display, or another suitable construct. Such displays can be front-lit, backlit, or inherently light emitting, as appropriate to the particular display type. In one or more examples, the display 104 may incorporate or be coupled to a touch sensor and is configured to operate as a user input device by way of touch input such as predefined gesturing and the like.

The media device 102 also includes one or more light emitters 108, each being configured and controlled to illuminate the display 104, or a portion of the display such as in the case of an emissive display. Non-limiting examples of light emitters 108 includes light-emitting diodes (LEDs), "full-spectrum" or red-green-blue (RGB) LEDs, quantum dots, or other suitable entities. As depicted, the media device 102 includes a total of three light emitters 108 distributed along an edge-wise aspect of the display 104. Other light emitter 108 counts or placements relative to the display 104 can also be used. A light spreading entity such as a formed platen or light-pipe array can also be used to uniformly illuminate the area of the display 104 by way of the light emitters 108. Thus, the light emitters 108 collectively define at least part of an illumination resource of the media device 102.

The light emitters 108 are individually controllable such that the overall color of light emitted from the display 104 is selectively adjustable. That is, a user 110 sees (or perceives) an illuminated area 112 that is uniform in color and intensity throughout the display 104. The illuminated area 112 aids in viewing in low ambient lighting situations and does not obscure the presented content 106.

The media device 102 includes a presentation module 114 configured to present content 106 using one or more of the output devices (haptic, auditory, and so forth) such as the display 104, or another device or resource of the media device 102. The presentation module 114 may be configured to produce audible output, as well. The presentation module 114 can be defined by or include any suitable resources or constituency such as, without limitation, machine-executable program code, electronic circuitry, and the like.

A lighting control module 116 is configured to control the respective light emitters 108. The lighting control module 116 can be defined by or include any suitable constituency such as, without limitation, machine-executable program code, electronic circuitry, and the like. In one example, the lighting control module 116 includes driver circuitry configured to individually drive or bias the light emitters 108 in accordance with signaling received from a processor or controller of the media device 102.

Usage data 118(1) is stored within the media device 102. The usage data 118(1) is acquired during normal operation and corresponds to a user 110 interaction with the presented content 106. Non-limiting examples of the usage data 118(1) include: a period of time that presented content 106 is presented; a time-of-day that a user 110 begins viewing the presented content 106; a time-of-day that a user 110 ends viewing the presented content 106; a rate at which a user 110 turns (virtual) pages of the presented content 106; detection that a user 110 has backtracked or rewound within the presented content 106; detection that the media device 102 is in motion during presentation of the presented content 106; a geographic location of the media device 102 during presentation of the presented content 106; and so forth.

In one sense, the usage data 118(1) includes characteristics of the presented content 106 viewing habits of a user 110. For example, the usage data 118(1) can indicate that the user 110 views textual content (e.g., a novel) during evening hours, presumably before going to sleep. In another example, the usage data 118(1) can indicate that the user 110 views video content during morning hours, while in motion—perhaps on public transit. In still another example, the usage data 118(1) can indicate that a user 110 typically slows their content viewing rate about a half-hour prior to ending a content viewing session. Countless other correlations or conclusions can also be drawn using the usage data 118(1).

The usage data 118(1) can also include user 110 input (or responses) to various queries regarding operating preferences, use of sleep- or alertness-aiding operating modes, user 110 feedback on the effectiveness of previously used operating modes, and so forth. Such queries, optional responses, and the like can be presented as presented content 106 on the display 104.

One or more pattern profiles 120(1) are stored within the media device 102. Each pattern profile 120(1) is defined by a time-dependent function used for modulating the intensity of illumination over time from the media device 102 within one or more spectral ranges of visible light. A pattern profile 120(1) is used by the lighting control module 116—or by a processor that signals the lighting control module 116—so as to control the intensity within the spectral range(s) (and thus, the overall color) of the light emitted by the lighting resources of the media device 102. Each pattern profile 120(1) can be derived or generated using the usage data 118(1), and can include linear ramping portions, dwell portions, non-linear portions, or other suitable characteristics.

The media device 102 is configured to communicate with other entities by way of one or more networks 122. The networks 122 can include the Internet (or access thereto), local area networks (LANs), wide area networks (WANs), and so on. Other media devices 124, respectively being the same as or differing from the media device 102, can also be connected to communicate with each other or other entities by way of the network(s) 122.

A content and operations server (server) 126 is configured to communicate with the media device 102 and the other media devices 124 by way of one or more of the networks 122. The server 126 is a remote entity with respect to the media device 102, without regard for respective geographic locations. The server 126 stores usage data 118(2). The usage data 118(2) can include raw usage data received from the media device 102 and the other media devices 124. The usage data 118(2) can also include usage data that has been analyzed or processed by a lighting mode determination module 128. The lighting mode determination module 128 is configured to process the usage data 118(2) in accordance with any suitable statistical operation, heuristic function, or other suitable technique. Such processed usage data 118(2) can also be communicated to the media device 102 and the other media devices 124 (i.e., designated as usage data 118(1)).

The lighting mode determination module 128 may use the usage data 118(2) to derive one or more pattern profiles 120 (2). For example, based on the usage data 118(2) indicating particular times of day which the user 110 reads text or watches video, a particular pattern profile 120(2) may be generated for that user 110. The pattern profile 120(2) may be used as provided by the server 126, or may be modified by the lighting control module 116 of the media device 102. Some of the pattern profiles 120(2) can be directed to assisting the user 110 in the natural onset of sleep while viewing the presented content 106. Others of the pattern profiles 120(2) can be directed to assisting the user 110 in remaining alert while viewing the presented content 106. The pattern profiles 120 (2) (one, some or all) can be communicated to the media device 102 and the other media devices 124 (i.e., as pattern profiles 120(1)) by way of the network(s) 122.

In some implementations the lighting mode determination module 128 may be configured to "push" or override the lighting control module 116 of the media devices 102. For example, the lighting mode determination module 128 of the server 126 may be configured to send a command or pattern profile 120(2) to the media devices 102 in use at a boarding school. This command or pattern profile 120(2) may be configured to facilitate sleep at a particular time of day.

Account data 130 is also stored within the server 126, and may include information regarding individual users 110, groups of users 110, or demographics related to users 110. Non-limiting examples of the account data can include user 110 ages (specific or bins), geographic locations (specific or regions), content subscription data or histograms, income information (specific or bins), billing or payment information, and so forth. The account data 130 may be used in generating or modifying one or more of the pattern profiles 120(2), or put to other purposes.

Content 132 is also stored within the server 126. The content 132 can include text-based viewable content, videos having moving pictures and sound, photographic images, technical or business presentations—static or video, and so on. The content 132 can be selectively communicated to the media device 102 and the other media devices 124. In one or more examples, the content 132 includes one or more novels, each formatted as some number of virtual pages that the user 110 can proceed through (forward or backward) by gesturing input to the display 104. Other content 132 can also be included.

The figures in this disclosure are illustrative. In some instances various features have been exaggerated in size for clarity of illustration. The figures are not necessarily to scale, and may not necessarily be proportionate with one another.

Figure 2:
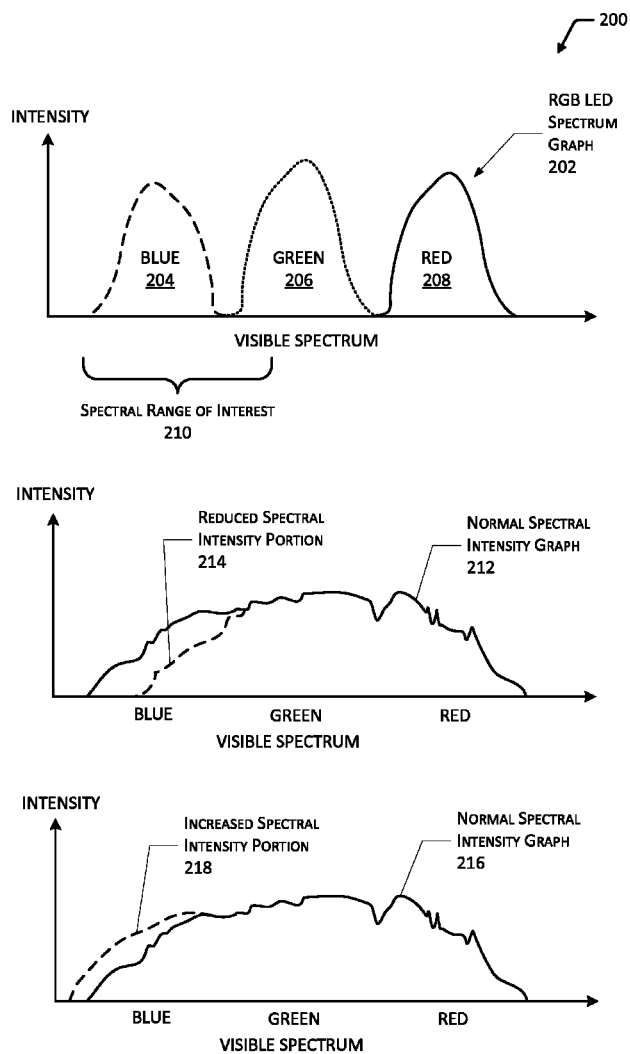
FIG. 2 is a collection of illustrative spectral emission intensity graphs.

FIG. 2 is a collection 200 of respective graphs, each depicting emission intensity curves for a portion of the electromagnetic spectrum. A graph 202 depicts an RGB LED spectrum, including emission intensity curves 204, 206 and 208 for three respective diodes of an illustrative "full-spectrum" LED. In particular, the blue curve 204 corresponds to a blue region (or range) of the visible spectrum. In turn, the green curve 206 and the red curve 208 correspond to green and red ranges of the visible spectrum, respectively. A spectral range of interest 210 corresponds to at least one span of the visible spectrum that is modulated under operations of the media device 102. In one example, the spectral range (of interest) 210 ranges from 400 nanometers to 550 nanometers in wavelength. Other suitable spectral ranges can also be identified and used.

The respective diodes (i.e., light emitters) of the graph 202 can be individually controlled or modulated so that color content emitted by a display 104 is selectively adjustable. Such modulation can be performed by a lighting control module 116 in accordance with a pattern profile 120(1).

A graph 212 depicts an emission intensity curve for normal operations of a media device 102. The graph 212 is illustrative and the specific characteristics thereof are not limiting with respect to the present application. The graph 212 corresponds to normal light intensities across a range of the visible spectrum while content is being viewed on a media device 102. That is, the graph 212 depicts a normal spectral response curve emitted by a display 104 while presenting the full, originally-intended color for some presented content 106. In one example, the graph 212 depicts the spectral intensity curve that a user 110 perceives at the beginning of a content 106 viewing session.

Also depicted is a graph portion 214 depicting a reduction of intensities for a portion of the spectrum of the graph 212. The graph portion 214 corresponds to light intensities within a spectral range (i.e., sub-range) that are reduced while content is being viewed on a media device 102. The graph portion 214 corresponds to spectral content in (or including) the blue area of the visible spectrum. Continuing the example cited immediately above, the graph 212—as attenuated within the graph portion 214—depicts an intensity curve that a user 110 perceives at or near the end of a presented content 106 viewing session. Thus, the reduced blue content depicted by the graph portion 214 is directed to aiding a user 110 in the normal onset of sleep.

A graph 216 depicts an emission intensity curve for other normal operations of a media device 102. The graph 216 is illustrative and non-limiting. The graph 216 corresponds to light intensities across a range of the visible spectrum while presented content 106 is being viewed on a media device 102. In one example, the graph 216 depicts the spectral intensity curve that a user 110 perceives at the beginning of a presented content 106 viewing session.

A graph portion 218 depicts an increase of intensities for a portion of the graph 216. The graph portion 218 corresponds to intensities within a spectral range including the blue portion of the visible spectrum, which are increased while content is being viewed on a media device 102. The graph 216— as enhanced within the graph portion 218—depicts an intensity curve that a user 110 perceives at or near the end of a presented content 106 viewing session. The increased blue content depicted by the graph portion 218 is directed to aiding a user 110 in remaining alert while viewing presented content 106.

Figure 3:
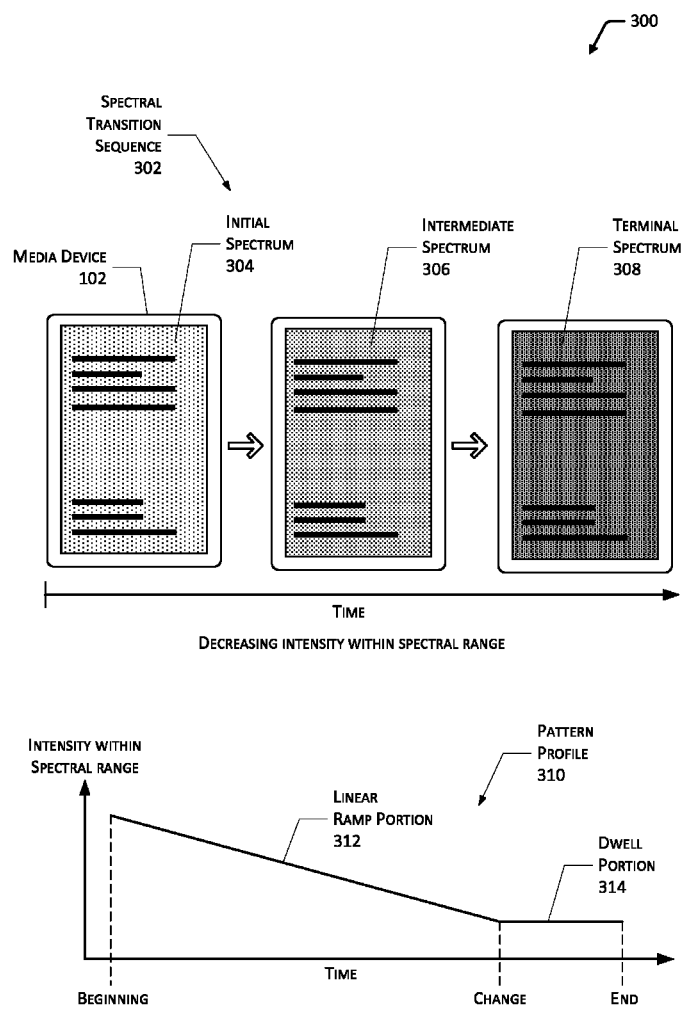
FIG. 3 illustrates a media device having decreasing spectral range intensity over time according to a pattern profile.

FIG. 3 depicts operations 300 of the media device 102. The operations 300 are illustrative and non-limiting.

A spectral transition sequence (sequence) 302 depicts a change or shift in the spectrum (i.e., emitted light color) content of display 104 of the media device 102. The media device 102 is characterized by initial spectrum 304 at the beginning of the sequence 302. The initial spectrum 304 includes intensities in the visual spectrum such that a normal color balance is perceived by a user 110 at the beginning of a content viewing session or period. Notably, intensities within a spectral range including the blue region of the visible spectrum are at normal or unmodified levels in the initial spectrum 304.

Later in the sequence 302, the media device 102 is characterized by an intermediate spectrum 306. The intermediate spectrum 306 includes reduced intensities within the spectral range, resulting in a somewhat redder or amber hue to the overall color emission. However, the presented content 106 remains clearly perceptible, without being unduly distractive to a user 110.

At the end of the sequence 302, the media device 102 is characterized by a terminal spectrum 308. The terminal spectrum 308 includes significantly reduced intensities within the spectral range resulting in a noticeably redder or amber overall color emission. The presented content 106 remains clearly perceptible. The blue-light content of the terminal spectrum 308 is lesser than that of the intermediate spectrum 306, which in turn is lesser than that of the initial spectrum 304.

A pattern profile 310 represents (or prescribes) emission intensity within the spectral range that is attenuated over time during the sequence 302. Thus, the pattern profile 310 depicts a time-dependent function used in controlling or modulating the light emitters 108 of the media device 102.

The pattern profile 310 includes a linear ramp portion 312 extending from a beginning instant to a change instant. The linear ramp portion 312 defines a temporal majority of the pattern profile 310. The intensity of emissions within the spectral range is decreased linearly over time during the linear ramp portion 312. The pattern profile 310 also includes a dwell portion 314 extending from the change instant to an end instant. The intensity of emissions within the spectral range is held constant during the dwell portion 314.

The spectral transition sequence 302 and the pattern profile 310 are illustrative of any number of operations wherein spectral emissions from a media device 102 are modulated over time so as to reduce blue-light content. The immediately foregoing operation is directed to aiding a user 110 with the onset of drowsiness and sleep, as is a typical goal when reading prior to bedtime.

The overall time span of the pattern profile 310 can be any suitable period such as 40 minutes, 1 hour, 2 hours, and so forth. In turn, the reduction in intensity amplitude can be any suitable value of fraction such as one-half, 25%, 40%, and so forth. The specific amplitude swing in spectral range intensity or the time period over which it occurs, or both, can be determined at least in part using usage data 118(1) or 118(2) (processed or otherwise). Thus, the pattern profile 310 can be derived or calculated using previously acquired content presentation start and end times (e.g., viewing session begins at night), geographic location (e.g., at home), and so on.

Figure 4:
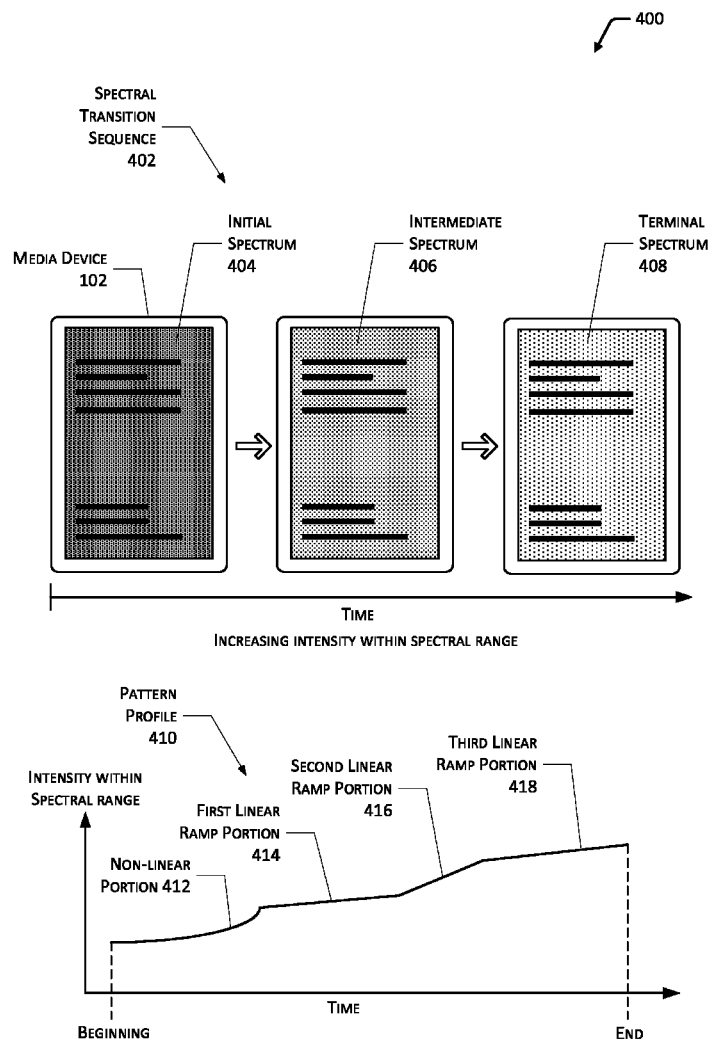
FIG. 4 illustrates a media device having increasing spectral range intensity over time according to a pattern profile.

FIG. 4 depicts operations 400 of the media device 102. The operations 400 are illustrative and non-limiting. A spectral transition sequence (sequence) 402 depicts transition in the spectrum of the display 104 of the media device 102. The beginning of the sequence 402 is characterized by an initial spectrum 404. The initial spectrum 404 includes intensities in the visual spectrum corresponding to a normal color balance. In particular, intensities within a spectral range including the visible blue region are at normal (un-attenuated) levels in the initial spectrum 404.

Later in the sequence 402, the display 104 of the media device 102 is characterized by an intermediate spectrum 406. The intermediate spectrum 406 includes increased intensities within the spectral range, resulting in a somewhat bluer hue to the overall color emission. However, overall color control is such that presented content 106 remains readily perceptible.

At the end of the sequence 402, the display 104 of the media device 102 is characterized by a terminal spectrum 408. The terminal spectrum 408 includes significantly increased intensities within the spectral range, such that a noticeably bluer overall color emission results. Yet, the presented content 106 remains clear and readily perceptible. The blue-light content of the terminal spectrum 408 is greater than that of the intermediate spectrum 406, which in turn is greater than that of the initial spectrum 404.

A pattern profile 410 represents (or prescribes) emission intensity within the spectral range that is increased (or enhanced) over time during the sequence 402. Thus, the pattern profile 410 depicts a time-dependent function used for controlling or modulating the light emitters 108 of the media device 102.

The pattern profile 410 includes a non-linear portion 412 that starts at a beginning instant. The intensity of emissions within the spectral range is increased non-linearly (e.g., logarithmically, etc.) over time during the non-linear portion 412. The profile pattern 410 also includes a first linear ramp portion 414 that beginnings immediately after the non-linear portion 412. The intensity of emissions within the spectral range increase linearly over time during the first linear ramp portion 414.

The pattern profile 410 also includes a second linear ramp portion 416, which begins immediately after the first linear ramp portion 414. The intensity of emissions within the spectral range increase linearly over time during the second linear ramp portion 416, at a slope or time-rate-of-change that is greater than that of the first linear ramp portion 414. The pattern profile 410 further includes a third linear ramp portion 418, which begins immediately after the second linear ramp portion 416 and terminates at the end of the pattern profile 410. The intensity of emissions within the spectral range increase linearly over time during the third linear ramp portion 418, at a slope that is lesser than that of the second linear ramp portion 416.

The spectral transition sequence 402 and the pattern profile 410 are illustrative of various contemplated operations such that emissions from a media device 102 are modulated over time so as to increase blue-light content. The immediately foregoing operation is directed to aiding a user 110 in remaining alert so as to avoid drowsiness, as is a typical goal when retention and understanding of viewing content is a priority such as during the later evening hours.

One or more of the respective portions 412-418, or the pattern profile 410 as a whole, may be generated or characterized at least in part using one or more of the usage data 118, or the account data 130. In one example, the account data 130 indicates that a particular user 110 is in the 45-50 years of age bin. Usage data 118(1) or 118(2) correlated to the 45-50 years of age bin indicates that such users are aided to natural sleep if the non-linear portion 412 is defined by a particular function. Thus, the pattern profile 410 may be modified so as to include that particular function or its characteristics. Other uses of the account data 130 or the usage data 118 may also be performed.

Figure 5:
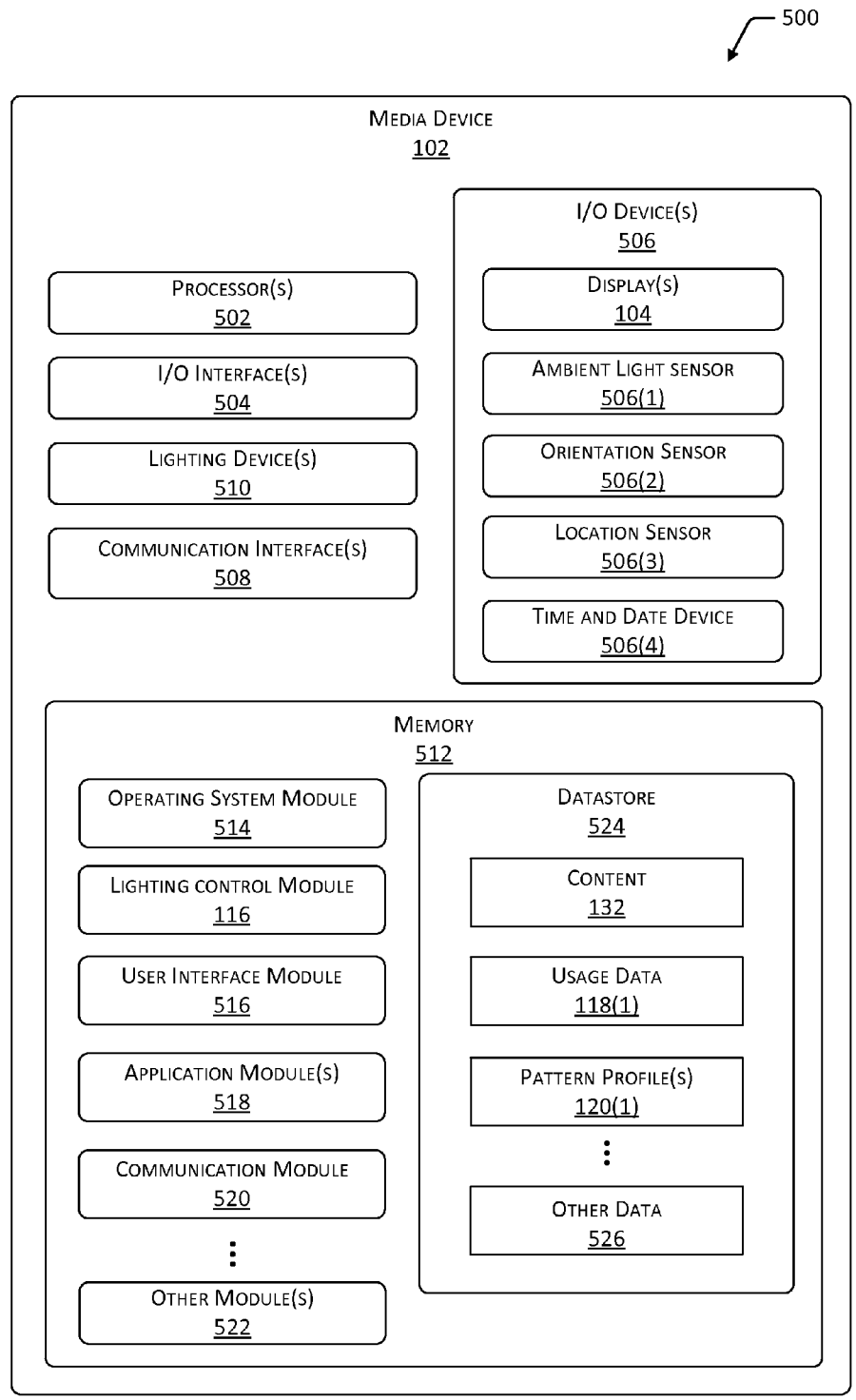
FIG. 5 is a block diagram of a media device and illustrative constituency.

FIG. 5 is a block diagram 500 of the media device 102. The media device 102 may include one or more processors 502 configured to execute one or more stored instructions. The processors 502 may comprise one or more cores. The media device 102 may include one or more input/output ("I/O") interface(s) 504 to allow the media device 102 to communicate with other devices. The I/O interfaces 504 may comprise inter-integrated circuit ("I2C"), serial peripheral interface bus ("SPI"), universal serial bus ("USB"), RS-232, media device interface, and so forth.

The I/O interface(s) 504 may couple to one or more I/O devices 506. The I/O device(s) 506 may include one or more displays 104, tactile switches, resistive switches, capacitive switches, motion sensors, orientation sensors, a global-positioning system (GPS) receiver, and so forth.

The one or more displays 104 are configured to provide visual output to the user 110. The one or more displays 104 may comprise an electrophoretic or cholesteric material and may be configured to present an image using reflected light, ambient light, light from a front light, and so forth. The one or more displays 104 may also comprise LCD configurations or other suitable constructs.

The one or more displays 104 may be coupled to the one or more processors 502, which are configured to control or cause the presentation of viewable content thereon. The one or more processors 502 may be configured to sense or receive signaling indicative of user 110 touch or gesturing of the one or more displays 104, or from other switches or user input devices. An ambient light sensor 506(1) is configured to sense ambient light levels about the media device 102 and to provide a corresponding electronic signal. For example, the ambient light sensor 506(1) may be used detect a low-level ambient lighting condition, presumed to indicate night time usage. The media device 102 may assume a particular operating mode during which emissions in a spectral range are modulated over time in order to aid the user 110 in the natural onset of sleep. Other operations may also be performed using the ambient light sensor 506(1).

An orientation sensor 506(2) is configured to sense an orientation of the media device 102 and to provide a corresponding signal. Such orientation signaling may be correlated to a user 110 position (upright, reclined, and so forth) during viewing of presented content 106. The media device 102 may then select an operating mode according to the sensed orientation. In another example, a pattern profile 120(1) presently being used may be modified in accordance with a change in orientation (e.g., user adjusts from seated to lying down, indicating fatigue) as detected by the orientation sensor 506(2).

A location sensor 506(3) is configured to sense a geographic location of the media device 102 and provide corresponding data or signaling. The location sensor 506(3) can be based upon or include global-position system (GPS) resources, cellular signal triangulation circuitry, or another suitable methodology. The media device 102 may report its location to another entity, to the content and operations server 126, and so on. In one example, certain types of content 132 (e.g., mature audience audio/video) may be streamed from the content and operations server 126 to the media device 102 only when the media device 102 is at its home location. Other operations may also be performed using the location sensor 506(3).

A time and date device 506(4) is configured to provide data or signaling (or both) corresponding to a present time-of-day and date for the media device 102. The time and date device 506(4) and may include electronic clock circuitry or other constituency. The time and date device 506(4) may be configured to be manually set, or to operate autonomously being re-synchronized by way of GPS signaling, cellular signaling, a network 122 resource, and so on.

The media device 102 may also include one or more communication interfaces 508 configured to provide communications between the media device 102 and other devices. Such communication interface(s) 508 may be used to connect to one or more personal area networks ("PAN"), local area networks ("LAN"), wide area networks ("WAN"), and so forth. For example, the communications interfaces 508 may include radio modules for a WiFi LAN and a Bluetooth PAN.

The media device 102 may also include one or more busses or other internal communications hardware or software that allow for the transfer of data between the various modules and components of the media device 102.

The media device 102 may also include one or more lighting devices 510. The lighting device(s) 510 may include LEDs, full-spectrum LEDs, quantum dot devices, or other suitable light emitting entities. The one or more lighting devices 510 are disposed and configured to illuminate the one or more one or more displays 104 in a backlit, front-lit, or other configuration. In some implementations, the lighting device(s) 510 can be controllable so as to modulate the light color (i.e., spectral content) emitted. The light emitters 108 are among the possible lighting devices 510.

As shown in FIG. 5, the media device 102 includes one or more memories 512. The memory 512 comprises one or more computer-readable storage media ("CRSM"). The CRSM may be any one or more of an electronic storage medium, a magnetic storage medium, an optical storage medium, a quantum storage medium, a mechanical computer storage medium and so forth. The memory 512 provides storage of computer readable instructions, data structures, program modules and other data for the operation of the media device 102.

The memory 512 may include at least one operating system (OS) module 514. The OS module 514 is configured to manage hardware resources such as the I/O interfaces 504 and provide various services to applications or modules executing on the processors 502.

Also stored in the memory 512 may be a user interface module 516. The user interface module 516 is configured to provide a user interface to the user 110. This user interface may be visual, audible, haptic, or a combination thereof. For example, the user interface module 516 may be configured to present a written content, video imagery or other images on the display(s) 104 and process the inputs of user input devices so as to take particular actions, such as paging forward or backward in an e-book.

The memory 512 may also include the lighting control module 116. The lighting control module 116 is configured to control the lighting device(s) 510 such that the color content (spectral content) of emissions therefrom can be maintained or modulated over time.

The lighting control module 116 may include electronic circuitry, power semiconductors, light emitter-drivers, a dedicated-purpose controller or processor, an application-specific integrated circuit (ASIC), and so forth. In one example, the lighting control module 116 receives signaling from the processor(s) 502 and controls or modulates the lighting device(s) 510 accordingly. Other configurations may also be used.

The memory 512 may include may also include one or more application modules 518. The application modules 518 may include one or more of eBook readers, browsers, calculators, word processors, spreadsheets, slideshow presenters, and so forth. One or more of the application modules 518 may be configured to access content 132, present the content 132 with the display 104 or other output devices, process user input, and so forth.

The memory 512 may also include a communications module 520 configured to support communication between the media devices 102, one or more servers, and so forth using the one or more networks 112. For example, the communications module 520 may be configured to establish communication with the content and operations server 126.

Other modules 522 may also be present. For example, a digital rights management module may be configured to support access to content 132 which is protected by one or more digital rights management schemes.

The memory 512 may also include a datastore 524 to store information. The datastore 524 may use a flat file, database, linked list, tree, or other data structure to store the information. In some implementations, the datastore 524 or a portion of the datastore 524 may be distributed across one or more other devices including servers, network attached storage devices, and so forth.

In some implementations, the datastore 524 may store a portion of the content 132. The content 132 includes visual matter, audio/video matter, or both, to be presented by way of the I/O device(s) 506. Such content 132 may specifically include one or more novels, technical literature, movies or other video matter, and so forth. The content 132 may be received from one or more remote entities such as a server or servers 126, from another media device 124, and so on. Such content 132 may also be managed, filed, shared, deleted, and so forth.

The datastore 524 may store one or more pattern profiles 120(1). Each pattern profile 120(1) is a time-dependent function for modulating the intensity of light within one or more spectral ranges as emitted from the lighting device(s) 510 during presentation of viewable content 132 on the display 104. In one example, the processor(s) 502 uses the pattern profile(s) 120(1), one or more at a time, in order to signal the lighting device(s) 510 such that light color emitted from the media device 102 is suitably controlled over time. The pattern profile(s) 120(1) may be respectively received from one or more remote entities, such as one or more servers 126 (wherein they are designated as pattern profiles 120(2)), or may be derived or modified by the processor(s) 502 of the media device 102.

Usage data 118(1) may also be stored within the datastore 524. The usage data 118(1) may include data, statistics or other information indicative of or derived from user 110 interaction with content 132 presented by way of the display(s) 104. Such usage data 118(1) can be acquired, augmented, accumulated or modified by the processor(s) 502 during normal content presentation operations, received from one or more remote entities, or any combination of these. The usage data 118(1) can also be communicated to one or more remote entities such as other media devices 124 or a server or servers 126 (as usage data 118(2)).

The usage data 118(1) may be used calculate or construct one or more pattern profile(s) 120(1), or to modify such pattern profile(s) 120(1) during the presentation of content 132. The datastore 524 may also include other data 526. The other data 526 may include any suitable data or information that is used or generated during operation of the media device 102. Non-limiting examples of the other data 526 include user 110 operating preferences, media device 102 identification codes, encryption keys for accessing the content 132, and so forth.

Figure 6:
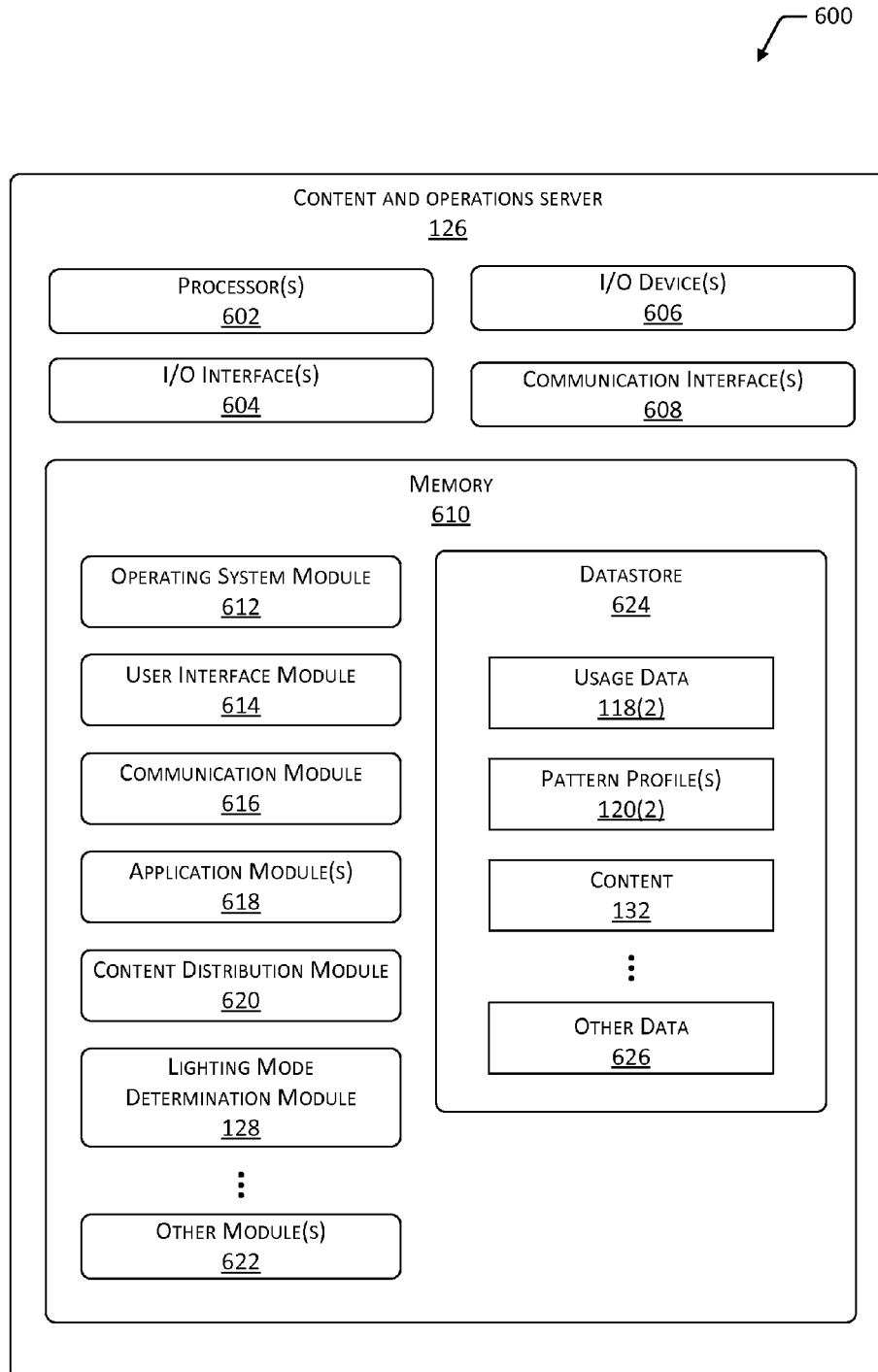
FIG. 6 is a block diagram of a content and operations server and illustrative constituency.

FIG. 6 illustrates a block diagram 600 of the content and operation server (server) 126 that may be configured to provide viewable content, usage data, pattern profiles, or any combination of these, to one or more media devices 102. The server 126 may include one or more processors 602 configured to execute one or more stored instructions. The processor(s) 602 may comprise one or more cores. The server 126 may include one or more I/O interface(s) 604 to allow the processor(s) 602 or other portions of the server 126 to communicate with other devices or media device 102. The I/O interfaces 604 may comprise I2C, SPI, USB, RS-232, and so forth.

The I/O interface(s) 604 may couple to one or more I/O devices 606. The I/O devices 606 may include input devices such as one or more of a keyboard, mouse, and so forth. The I/O devices 606 may also include output devices such as one or more of a display, audio speakers, haptic output devices, and so forth. In some embodiments, the I/O devices 606 may be physically incorporated with the server 126 or may be externally placed.

The server 126 may also include one or more communication interfaces 608. The communication interfaces 608 are configured to provide communications between the server 126, the media devices 102, routers, access points, servers, and so forth. The communication interfaces 608 may include devices configured to couple to one or more networks including PANs, LANs, WLANs, WANs, and so forth.

The server 126 may also include one or more busses or other internal communications hardware or software that allow for the transfer of data between the various modules and components of the server 126.

As shown in FIG. 6, the server 126 includes one or more memories 610. The memory 610 comprises one or more CRSM. The memory 610 provides storage of computer readable instructions, data structures, program modules and other data for the operation of the server 126.

The memory 610 may include at least one operating system (OS) module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the following modules. These modules may be executed as foreground applications, background tasks, daemons, and so forth.

A user interface module 614 may be configured to provide one or more application programming interfaces. The user interface module 614 may also provide data configured to provide the user interface modules 516 on the media devices 102, such as hypertext markup language ("HTML") files. The user interface module 614 is configured to accept inputs and send outputs using the I/O interfaces 604, the communication interfaces 608, or both.

A communication module 616 is configured to support communication with the media devices 102, routers, and so forth using one or more networks 122. In some implementations the communication module 616 may support encrypted communications. For example, hypertext transport protocol secured ("HTTPS") or transport layer security ("TLS") may be supported.

The memory 610 may also include one or more application modules 618. The application modules 618 may be configured or modified, and selectively provided to the media device 102 as the application modules 518. Thus, the media device 102 can be updated or enhanced as new application modules 618 are generated, existing application modules 618 are amended or improved, and so on.

A content distribution module 620 may be stored in the memory 610. The content distribution module 620 may be configured to provide at least a portion of the content 132 to the media device 102. For example, the content distribution module 620 may be configured to determine access rights to the content 132 associated with the media device 102, the user 110, or both, and send the content 132 over the network 122. In some implementations, information such as statistics about access to the content 132 may be incorporated into the usage data 118(2).

The memory 610 may also include the lighting mode determination module 128. The lighting mode determination module 128 is configured to process the usage data 118(2) by way of statistical operations, heuristic functions, or other suitable techniques. The lighting mode determination module 128 may use the usage data 118(2) or the account data 130, or both, to derive one or more pattern profiles 120(2). Any particular pattern profile 120(2) may be used as provided by the server 126, or may be modified by the lighting control module 116 of the media device 102 (as a pattern profile 120(1)).

In one or more instances, the lighting mode determination module 128 may be configured to override the lighting control module 116 of the media devices 102. For example, the lighting mode determination module 128 may be configured to send a command or pattern profile 120(2) to the media devices 102 in use at a boarding school. This command or pattern profile 120(2) may be configured to facilitate sleep at a particular time of day.

Other modules 622 may also be present. In one implementation, a language translation module may be configured to provide translation of viewable content, messages, or both, enabling directed interaction of a group of users 110 which use different languages. For example, the text messages may be translated between German and English and vice versa.

The memory 610 may also include a datastore 624 to store information. The datastore 624 may use a flat file, database, linked list, tree, executable code, or other data structure to store the information. In some implementations, the datastore 624 or a portion of the datastore 624 may be distributed across one or more other devices including servers, network attached storage devices and so forth.

As depicted here, the datastore 624 may store one or more of the usage data 118(2), the pattern profiles 120(2), the content 132, or any combination of these, as previously described. Other data 626 may also be stored. For example, the other data 626 may include user 110 preferences, configuration files, user 110 account information, content 132 encryption keys, and so forth.

Figure 7:
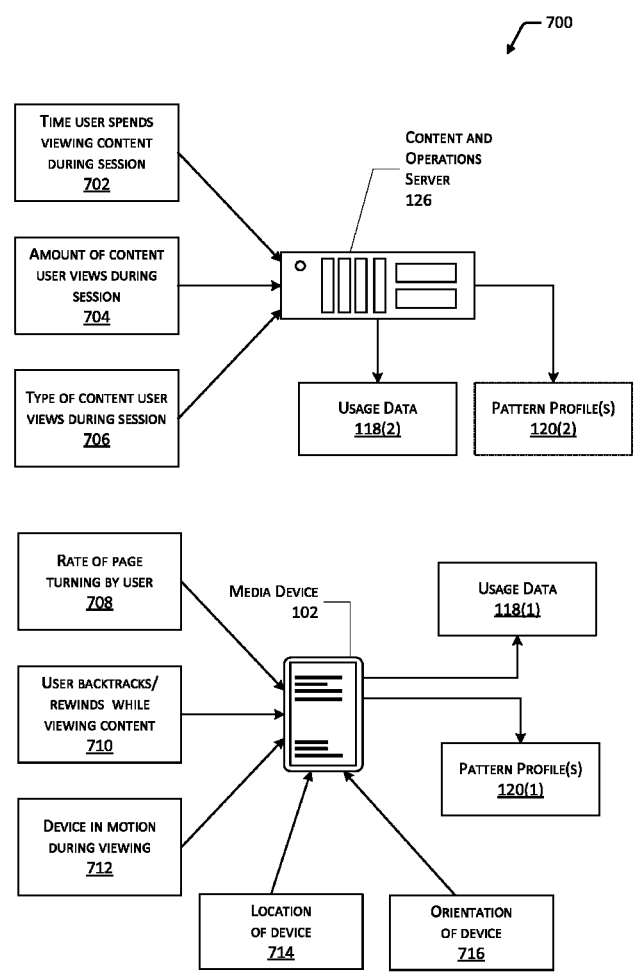
FIG. 7 illustrates respective usage data of a media device and a content and operations server and pattern profiles generated using the usage data.

FIG. 7 illustrates a block diagram 700 of information that may be input to or generated within the media device 102 and the content and operations server 126, respectively. Also depicted is various information and usage data 118(1) and 118(2) that may be output from or generated within the media device 102 and the content and operations server 126, respectively. The particular information and usage data depicted by FIG. 7 are illustrative and non-limiting.

Information sent to or generated within the server 126 can include a time a user 110 spends viewing content during a session (viewing time) 702. The viewing time 702 can be defined in units of seconds, minutes, hours or a suitable combination thereof. The viewing time 702 can be raw data, a calculated average of plural distinct viewing sessions, and so forth. In one example, the viewing time 702 indicates that a user 110 views content for an average of 1.5 hours in an average session. Optionally, the viewing time 702 can include time-of-day information indicating when such a viewing session begins, ends, or both.

Information sent to or generated within the server 126 can include an amount of content a user 110 views during a session (content amount) 704. The content amount 704 can be defined in units of a virtual page count, numbers of chapters, a number of written words, minutes of video footage, and so on. In one example, the content amount 704 indicates that a user 110 viewed 75 pages of the content 132 during a most recent viewing session.

Information sent to or generated within the server 126 can also include a type of content a user 110 views during a session (content type) 706. The content type 706 can be defined in terms of class or type identifiers such as written novels, technical literature, business literature, academic matter, sports periodicals, investment news, dramatic movies, and so on. In one example, the content type 706 indicates that a user 110 viewed business journal content during a most recent viewing session. Countless other types of usage data can be input to or stored within the server 126.

The server 126 can store, accumulate, or process any or all of 702-706 above. Such accumulated information can define, in whole or in part, the usage data 118(2). In turn, the usage data 118(2) can be communicated, in whole or in part, to the media device 102 or other media devices 124 by way of the network(s) 122.

Information sent to or generated within the media device 102 can include a rate of virtual page turning by a user 110 (page rate) 708. The page rate 708 can be defined in units of pages per minute or, inversely, seconds per page. The page rate 708 can be raw data, a calculated average, and so forth. In one example, the page rate 708 indicates that a user 110 views written content at an average rate of 20 seconds per (virtual) page.

Information sent to or generated within the media device 102 can also include an indication of whether or not a user 110 has backtracked (turn back a page or pages) or rewound and reviewed video content (backtracking) 710. Backtracking 710 can be defined as yes/no or I/O flagging, a quantification of the backtracked content, or a cumulative count of detected backtracking events. In one example, the backtracking 710 indicates that a user 110 backtracked 2 pages of written material during a current viewing session.

Information sent to or generated within the media device 102 can also include an indication of whether or not the media device 102 is in motion during a presentation of viewable content (motion) 712. Motion 712 can be defined in simple yes/no or I/O flagging. Alternatively, the motion 712 can include a quantification of time or approximate average velocity of such motion, such as determined by way of accelerometers. In one example, the motion 712 indicates that a user 110 is in motion during a current viewing session.

Information sent to or generated within the media device 102 can also include a geographic location of the media device 102 during a presentation of viewable content (location) 714. Location 714 can be defined in geographical coordinates as determined using the location sensor 506(3), global positioning resources, a postal zip code or telephonic area code as determined by cellular network communications, and so forth. In one example, the location 714 indicates that a user 110 is at their home address while viewing content during a current session.

Information sent to or generated within the media device 102 can also include an orientation of the media device 102 during a presentation of viewable content (orientation) 716. Orientation 716 may be quantified in units of degrees or radians of arc away from either an upright or level position, as determined using the orientation sensor 506(2). Roll or tilt angle of the media device 102 about one or two other axis may also be respectively sensed and quantified. Other units of measure or corresponding data may also be used.

The media device 102 can store, accumulate, or process any or all of 708-714 above. Such accumulated information can define, in whole or in part, the usage data 118(1). In turn, the usage data 118(1) can be communicated, in whole or in part, to other media devices 124, to the server 126, or both, by way of the network(s) 122. In turn, the media device 102 and the server 126 can generate, modify or communicate pattern profile(s) 120(1) and 120(2), respectively, between each other or other entities.

Figure 8:
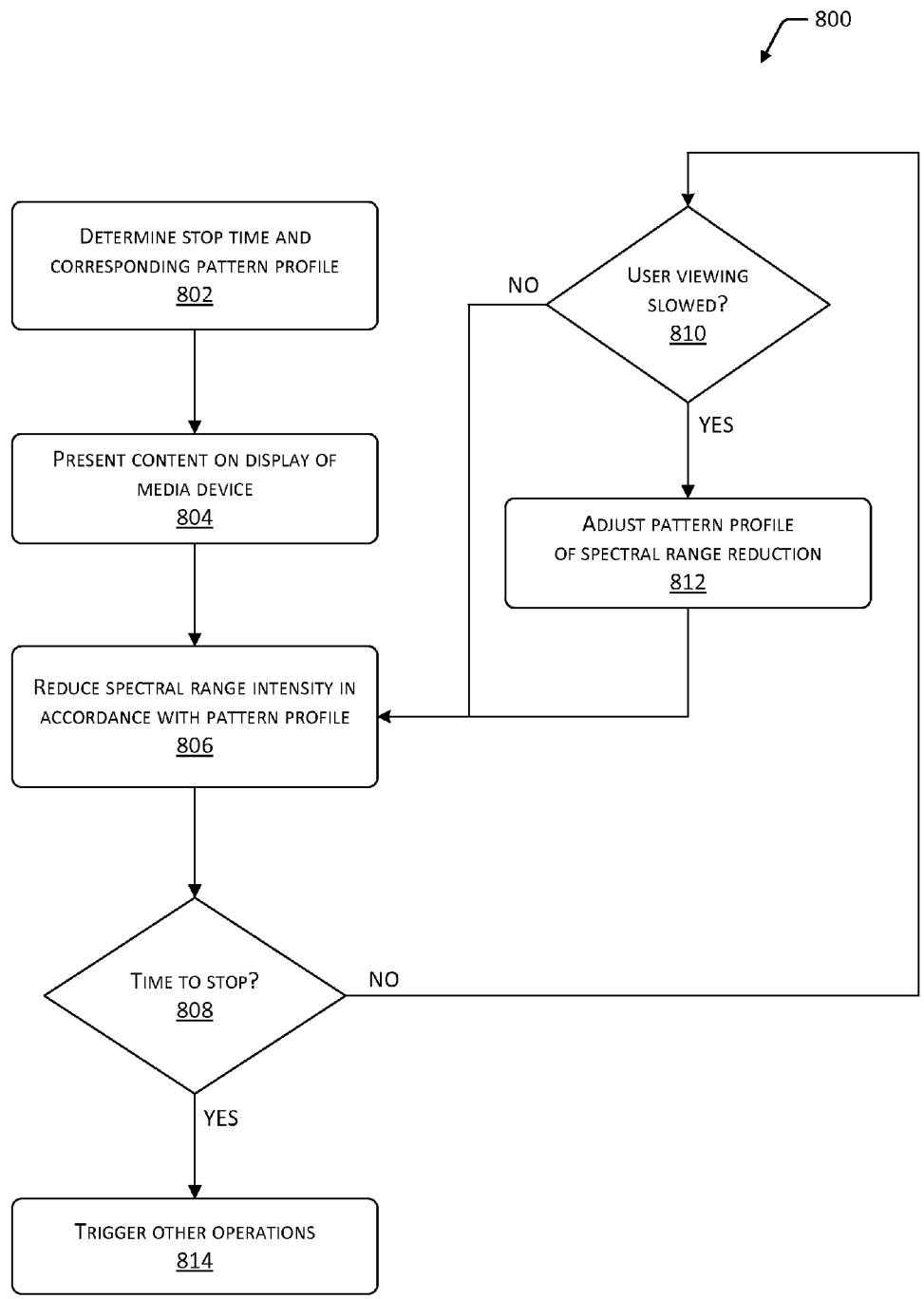
FIG. 8 is a flow diagram of an illustrative process of reducing spectral range intensity over time as content is presented to a user.

FIG. 8 is a flow diagram 800 of a process for controlling spectral emissions from a media device 102 while presenting content to a user 110. In some implementations, this process may be implemented by way of the media device 102 and the respective resources thereof.

Block 802 determines a stop time and a pattern profile 120(1) to be used with the presented content 106. For example, a user 110 may seek to view written material (a novel) on the display 104 of the media device 102. Additionally, the user 110 is initiating such content 132 presentation at 8 o'clock in the evening. The media device 102 determines, by way of the processor(s) 502 and the usage data 118(1), that the user 110 will likely read the presented content 106 for 1 hour and then (presumably) retire to sleep.

The media device 102 then selects a pattern profile 120(1) in accordance with a sleep-assistance mode, modifying the pattern profile 120(1) in accordance with the present mode. For purposes of a present example, it is assumed that the media device 102 selects the pattern profile 310 and modifies its characteristics in accordance with the 1 hour estimated presentation period.

Block 804 presents content 106 on the display 104 of the media device 102. In the present example, a written novel received previously from the content 132 of the server 126 is presented on the display 104 of the media device 102. Such presentation is made under the control of the processor(s) 502, presentation module 114, or other resources of the media device 102.

Contemporaneous with the beginning of the presented content 106, the processor(s) 502 signals the lighting control module 116, causing it to drive or bias the light emitters 108 such that a normal color balance of light illuminates the display 104. The illuminated area 112 is characterized by light emissions having a normal spectral content in the blue-light region of the visible spectrum (i.e., the spectral range).

Block 806 reduces intensity in the spectral range in accordance with the pattern profile 310. In the present example, the processor(s) 502 signals the lighting control module 116 based on the (modified) pattern profile 310. This signaling causes the lighting control module 116 to drive or bias the light emitters 108 so as to reduce emissions within the spectral range over time, resulting in reduced illumination in the blue range of the visual spectrum. Generally, the pattern profile 310 (or another pattern profile 120(1)) is configured such that color content shift in the illumination of the media device 102 is undetectable to the human eye on a moment-to-moment basis.

Block 808 determines whether or not it is time to stop the presented content 106. The determination is made in accordance with 1 hour viewing time estimated at block 802. If the stop time has not yet arrived, the process proceeds on to block 810. If the stop time has arrived, the process proceeds on to block 814.

Block 810 determines whether or not a user 110 has slowed their rate of viewing the presented content 106. The determination is made in accordance with one or more detected user 110 interactions with the presented content. In the present example, the processor(s) 502 determines if the user 110 is turning virtual pages of content at lesser than a predetermined threshold rate. If content viewing has slowed per the detection schema, then the process proceeds to block 812. If the content viewing has not slowed, then the process proceeds back to block 806.

Block 812 adjusts the pattern profile 310 based on the determination made at block 810 above. In the present example, the pattern profile 310 is further modified so as to reduce spectral range intensity at a greater rate—that is, by increasing the downward slope of the linear ramp portion 312. Thus, the dwell portion 314 may be extended in time, reduced to a lower than originally determined magnitude, or both. The 1 hour viewing time is preserved as the overall content presentation period in this example. The process then proceeds back to block 806.

Block 814 triggers other operations of the media device 102. In the present example, the stop time has arrived as determined at block 808. The processor(s) 502 signals the lighting control module 116 and other resources of the media device 102 such that the presentation of written content (the novel) is ended. The media device 102 can now shutdown, present other content or perform other operations accordingly.

Figure 9:
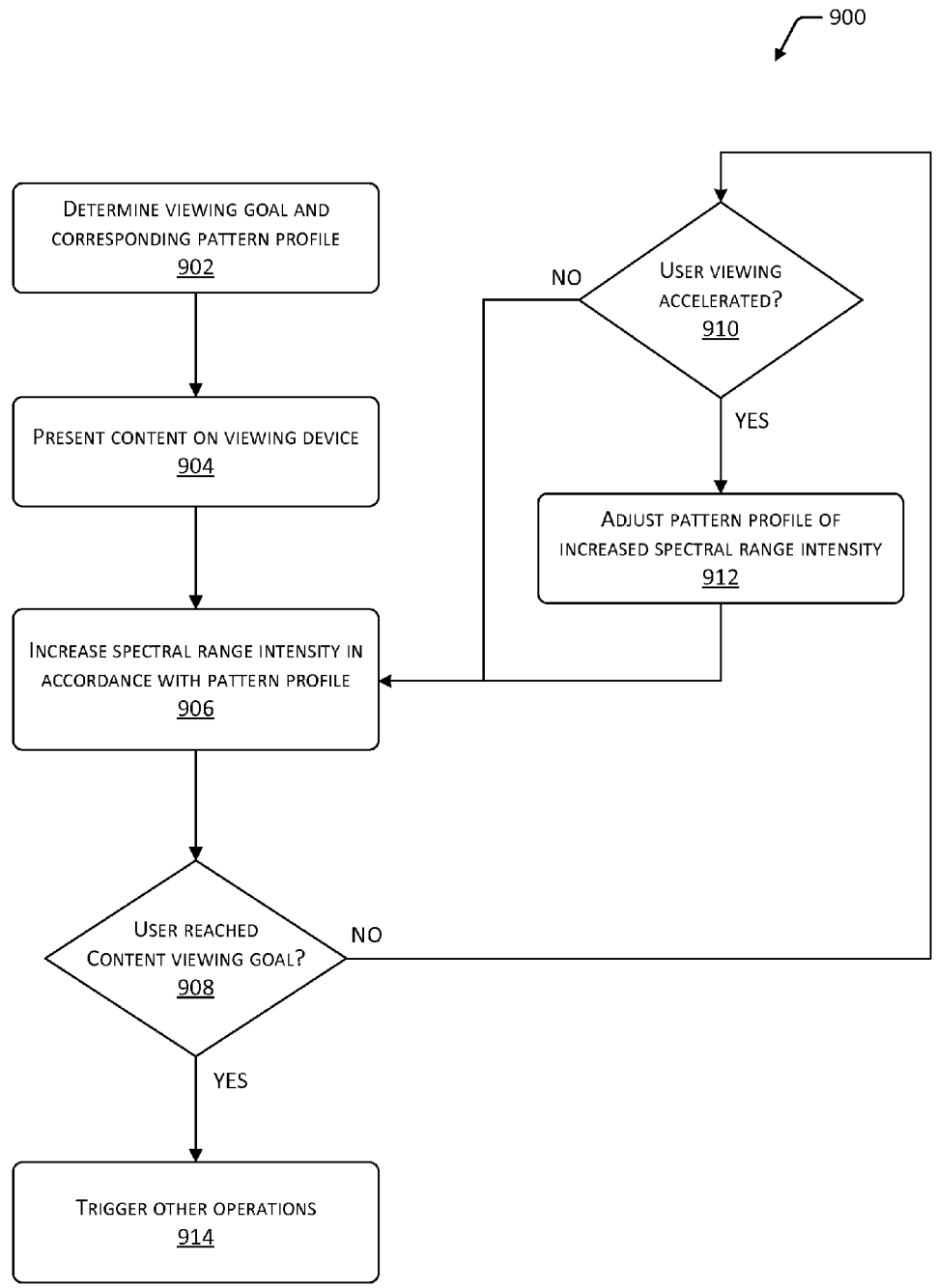
FIG. 9 is a flow diagram of an illustrative process of increasing spectral range intensity over time as content is presented to a user.

FIG. 9 is a flow diagram 900 of a process for controlling spectral emissions while presented content 106 is being viewed by a user 110. In some implementations, this process may be implemented by way of the media device 102 and the respective resources thereof.

Block 902 determines a viewing goal and a pattern profile 120(1) for presented content 106. For example, a user 110 may seek to view a video presentation (a business report) on the display 104 of the media device 102. Additionally, the user 110 is initiating the presented content 106 at 9 o'clock in the evening. The media device 102 determines, by way of the processor(s) 502 and the usage data 118(1), that the user 110 will likely want to view the entire presentation, which is 72 minutes long.

The media device 102 then selects a pattern profile 120(1) in accordance with an alertness-assistance mode, modifying the pattern profile 120(1) in accordance with the present mode. For purposes of a present example, it is assumed that the media device 102 selects the pattern profile 410 and modifies its characteristics in accordance with the 72 minute estimated presentation period.

Block 904 presents content 106 on the display 104 of the media device 102. In the present example, the business report received previously from the content 132 of the server 126 is presented on the display 104 of the media device 102. Such presentation is made under the control of the processor(s) 502, presentation module 114, or other resources of the media device 102.

Contemporaneous with the beginning of the video content presentation, the processor(s) 502 signals the lighting control module 116, causing it to drive the light emitters 108 so as to illuminate the display 104 with a normal color balance of light. The illuminated area 112 is characterized by light emissions of normal spectral content, including within the blue-light region of the visible spectrum.

Block 906 increases intensity in the spectral range in accordance with the pattern profile 410. In the present example, the processor(s) 502 signals the lighting control module 116 based on the (modified) pattern profile 410. This signaling causes the lighting control module 116 to drive the light emitters 108 so as to increase emissions within the spectral range over time, resulting in increased illumination color content in the blue range of the visual spectrum. The user 110 perceives illumination of the display 104 that is shifting or transitioning toward a bluer hue while the video content is being presented.

Block 908 determines whether or not the user 110 has reached the estimated presented content 106 viewing goal. The determination is made in accordance with whether the full 72 minute video has yet been presented. If the video presentation is not yet complete, then the process proceeds on to block 910. If the video presentation is complete, then the process proceeds on to block 914.

Block 910 determines whether or not the user 110 has accelerated their rate of viewing the presented content 106. The determination is made in accordance with detected user 110 interactions with the presented content 106. In the present example, the processor(s) 502 determines if the user 110 is moving forward through the video at greater than normal playback speed by way of fast-forwarding, jumping forward in the video content, or by another technique. If the presented content 106 viewing has accelerated, then the process proceeds to block 912. If the presented content 106 viewing has not accelerated, then the process proceeds back to block 906.

Block 912 adjusts the pattern profile 410 based on the determination made at block 910 above. In the present example, the pattern profile 410 is further modified so as to increase spectral range intensity at a reduced rate in view of the determination that the user 110 will likely finish viewing the presentation ahead of the estimated schedule. Thus, one or more of the portions 412-418 can be varied so that illumination in the spectral range (blue-light content) is less intense at the end of the video presentation then as originally determined. The process proceeds back to block 906.

Block 914 triggers other operation of the media device 102. In the present example, all of the video content has been presented, as determined at block 908. The processor(s) 502 signals the lighting control module 116 and other resources of the media device 102 such that the presentation of video content is ended. The media device 102 can now shutdown, present other content or perform other operations accordingly.

Figure 10:
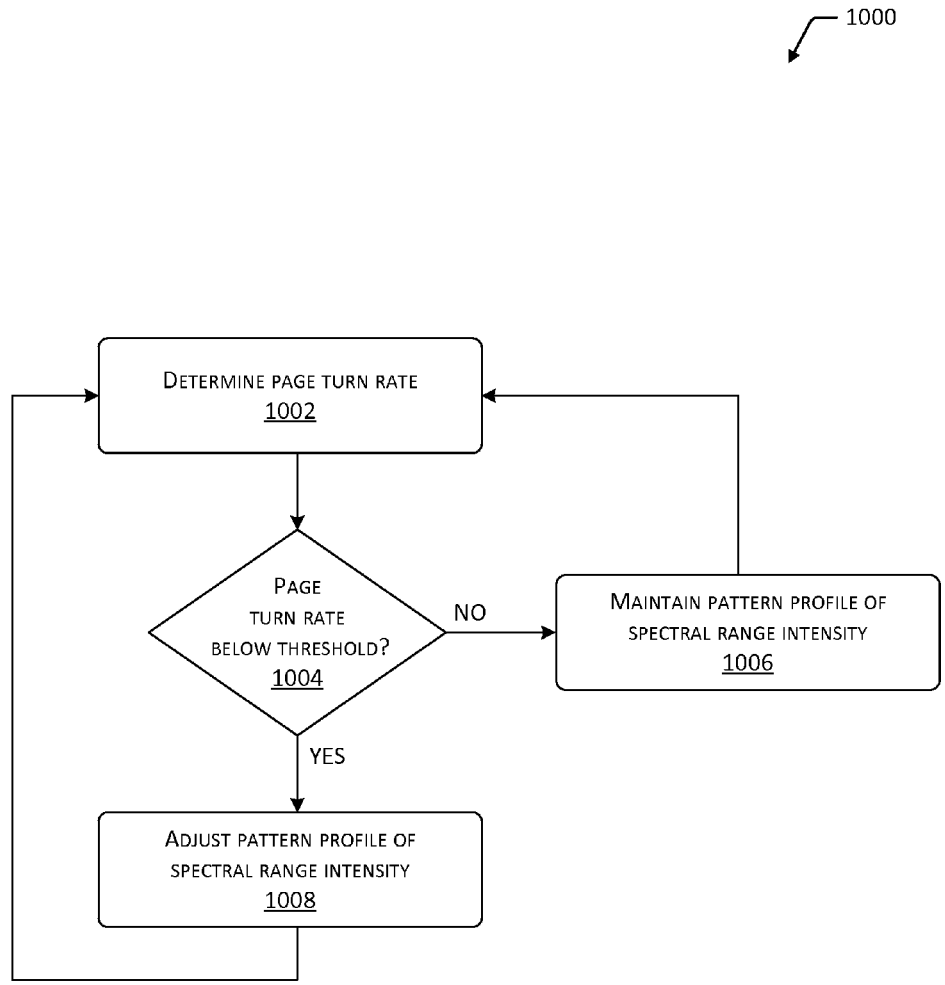
FIG. 10 is a flow diagram of an illustrative process of adjusting a pattern profile in response to determining a slowing of user viewing of presented content.

FIG. 10 is a flow diagram 1000 of a process for controlling spectral emissions while presenting content 106 to a user 110. In some implementations, this process may be implemented by way of the media device 102 and the respective resources thereof.

Block 1002 determines a page turn rate. For example, a user 110 is viewing written content formatted as a sequence of virtual pages, mimicking a book. The processor(s) 502 determine a rate at which the user 110 is turning virtual pages while the presented content 106 is on the display 104. Such a rate can be quantified in units of pages/minute, seconds/page, and so forth.

Block 1004 determines if the page turn rate is below a threshold. In the present example, the processor(s) 502 compares the rate determined at block 1002 above with a predetermined threshold value. If the page turn rate is not lesser than the threshold value, the process proceeds to block 1006. If the page turn is lesser than the threshold value, the process proceeds to block 1008.

Block 1006 maintains a pattern profile 120(1) of spectral range intensity. In the present example, the processor(s) 502 signals the lighting control module 116 to modulate (increase or decrease) light emissions in a spectral range over time according to a presently used pattern profile 120(1). The present characteristics of that pattern profile 120(1) are maintained in response to the comparison made at block 1004 above. The process proceeds back to block 1002.

Block 1008 adjusts the pattern profile 120(1) of spectral range intensity. In the present example, the processor(s) 502 alters one or more characteristics of the presently used pattern profile 120(1) in response to the determination made at block 1004 above. For non-limiting example, respective ramping slopes, portion time periods, non-linear functions or other attributes can be adjusted in accordance with detecting a slowing of the rate at which the user 110 is viewing content. The process proceeds back to block 1002.

Figure 11:
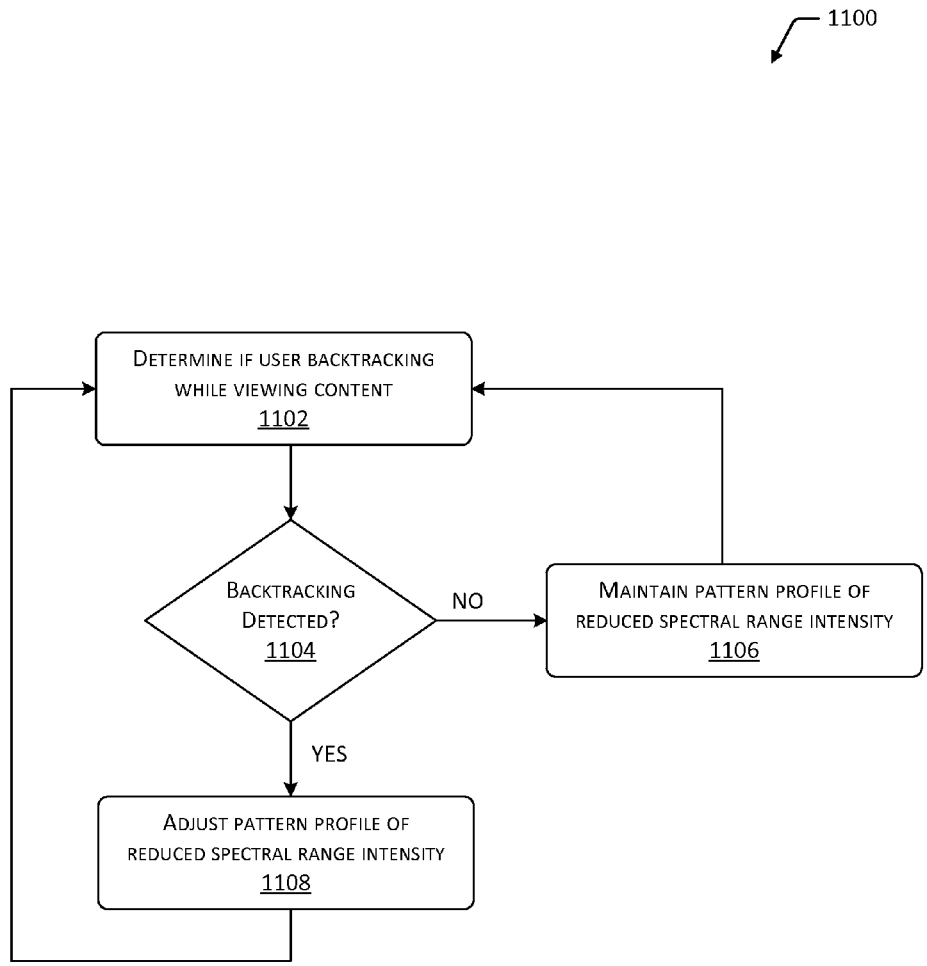
FIG. 11 is a flow diagram of an illustrative process of adjusting a pattern profile in response to determining an acceleration of user viewing of presented content.

FIG. 11 is a flow diagram 1100 of a process for controlling spectral emissions while presenting content 106 to a user 110. In some implementations, this process may be implemented by way of the media device 102 and the respective resources thereof.

Block 1102 detects for user 110 backtracking while viewing content 106. For example, a user 110 is viewing written content formatted as a sequence of virtual pages. The processor(s) 502 monitors the turning of virtual pages on the display 104. Such monitoring can include, without limitation, setting or toggling a bit (or flag) according to a backward progression through the presented material, even if only a single page.

Block 1104 determines if backtracking was detected at block 1102 above. If backtracking is not detected, the process proceeds to block 1106. If backtracking is detected, the process proceeds to block 1108.

Block 1106 maintains a pattern profile 120(1) of reduced spectral range intensity. In the present example, the processor(s) 502 signals the lighting control module 116 to decrease light emissions in a spectral range over time according to a presently used pattern profile 120(1). The particular pattern profile 120(1) being used corresponds to assisting a user 110 in achieving a natural onset of sleep at the end of their estimated presented content 106 viewing period. The process proceeds back to block 1102.

Block 1108 adjusts the pattern profile 120(1) of reduced spectral range intensity. In the present example, backtracking is interpreted as indicating fatigue on the part of the user 110. The processor(s) 502 responds to this interpretation by changing one or more characteristics of the current pattern profile 120(1). For non-limiting example, respective ramping slopes, dwell portion time periods, or other attributes can be adjusted in response to detecting user 110 backtracking within the presented content 106. The process proceeds back to block 1102.

Those having ordinary skill in the art will readily recognize that certain components, steps, or operations illustrated in in the figures above can be eliminated, taken in an alternate order, or otherwise rearranged. Moreover, the methods described above may be implemented as one or more software programs for a computer system and are encoded in a computer-readable storage medium as instructions executable on one or more processors.

The computer-readable storage medium (CRSM) can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A device comprising:
a display configured to present content;
one or more input devices;
one or more light emitters configured to illuminate the display; and
a processor configured to:

present the content using the display with a first display output mode operating the one or more light emitters using a first intensity curve of light emissions across a first portion and a second portion of a range of wavelengths from about 380 nanometers to 570 nanometers;

receive one or more user inputs from the one or more input devices;

generate usage data based on the one or more user inputs, wherein the usage data is indicative of a time-of-day of ending presentation of content on the display; and based at least in part on the usage data, transition over a period of time of at least five minutes to a second display output mode operating the one or more light emitters to generate a second intensity curve of light emissions having a second intensity of light emissions across the first portion of the range of wavelengths that is less than the first intensity curve and having the second intensity of light emissions across the second portion of the range of wavelengths being the same as the first intensity curve.

2. The device of claim 1, wherein the usage data is further indicative of one or more of:

a rate at which a user turns pages of content presented by the display;

orientation of the device during presentation of content on the display;

detection that a user has backtracked within content presented on the display;

detection of motion of the device during presentation of content on the display; or a geographic location of the device during presentation of content on the display.

3. The device of claim 1, wherein the second intensity curve of light emissions for the first portion of the range of wavelengths is lower than the first intensity curve of light emissions for the second portion of the range of wavelengths by at least 50%.

4. The device of claim 1, wherein the display comprises an electrophoretic display and a frontlight film coupled to a front of the electrophoretic display, wherein the frontlight film is optically coupled to the one or more light emitters such that emitted light from the one or more light emitters is distributed by the frontlight film to illuminate the electrophoretic display; and at least one of the light emitters comprising a red-green-blue light-emitting diode (RGBLED), each RGBLED including individually controllable diodes corresponding to different regions of the visual spectrum.

5. A system, comprising:

a server configured to:

receive usage data from a media device, wherein the usage data is indicative of consumption by a user of content comprising an electronic book;

derive a pattern profile by way of the usage data;

provide at least one or more of the usage data or the pattern profile to a media device; and a media device including a display and an illumination resource and a controller, the controller configured to:

present the content on the display;

provide usage data to the server, the usage data corresponding to the user interaction with content presented on the display;

receive the pattern profile from the server, wherein the pattern profile specifies a transition over time from a first output mode to a second output mode; and control, based at least in part on the pattern profile, one or more of the display or the illumination resource to change from using a first intensity curve of light emissions across a first portion and a second portion of spectral range while content is being presented on the display to a second intensity curve having a second intensity of light emissions across the first portion of the spectral range that differs from the first intensity curve while having the second intensity of light emissions across the second portion of the spectral range being the same as the first intensity curve.

6. The system of claim 5, the controller and the display and the illumination resource further respectively configured such that spectral range includes at least the range from 400 nanometers to 550 nanometers.

7. The system of claim 5, the controller further configured to:

query a user regarding options for operating the media device;

receive a user response to the query; and control the intensity of light emissions in the spectral range based at least in part on the user response.

8. The system of claim 5, the controller further configured such that the pattern profile is directed to influencing human sleep during presentation of content on the display.

9. The system of claim 5, the controller further configured such that the pattern profile includes linear ramping portions of respectively different slopes of the pattern profile.

10. The system of claim 5, the controller further configured such that the pattern profile includes a linear ramping portion and a dwell portion.

11. The system of claim 5, the controller further configured to increase the intensity of light emissions in the spectral range over time in accordance with the pattern profile while content is being presented on the display.

12. The system of claim 5, the controller further to decrease intensity of light emissions in the spectral range over time in accordance with the pattern profile while content is being presented on the display.

13. A non-transitory computer-readable storage media including a program code, the program code configured to cause one or more processors to:

derive usage data corresponding to user interaction with viewable content presented by a media device, wherein the user interaction comprises a page turn of an electronic book and the usage data is indicative of a page turn rate;

present viewable content using the media device; and modulate illumination intensity of the media device within a first portion of a predetermined spectral range between an initial magnitude of light intensity and a terminal magnitude of light intensity over a period of at least five minutes while the initial magnitude of light intensity across a second portion of the predetermined spectral range remains the same, the modulation performed in accordance with the usage data and a pattern profile during the presentation of viewable content.

14. The non-transitory computer-readable storage media of claim 13, the program code further configured to cause the one or more processors to control at least a display of the media device or an illumination entity of the media device so as to modulate illumination intensity from the media device within the predetermined spectral range according to the usage data and the pattern profile.

15. The non-transitory computer-readable storage media of claim 13, the program code further configured to cause the one or more processors to:

determine user intent to operate the media device in a human-sleep promoting mode; and modulate illumination intensity from the media device within the first portion of the predetermined spectral range over time such that the initial magnitude of the illumination intensity is greater than the terminal magnitude.

16. The non-transitory computer-readable storage media of claim 13, the program code further configured to cause the one or more processors to:

determine user intent to operate the device in a human-sleep inhibiting mode; and modulate illumination intensity from the media device within the first portion of the predetermined spectral range over time such that the initial magnitude of the illumination intensity is lesser than the terminal magnitude.

17. The non-transitory computer-readable storage media of claim 13, the program code further configured such that the predetermined spectral range includes the range of 450 nanometers to 550 nanometers.

18. The non-transitory computer-readable storage media of claim 13, the program code further configured to cause the one or more processors to modulate the illumination intensity of the media device within the predetermined spectral range in accordance with a content viewing goal for a user.

19. The non-transitory computer-readable storage media of claim 13, the program code further configured to cause the one or more processors to:

detect that a user is viewing content on the media device at a page turn rate greater than a predetermined rate; and increase a rate at which the illumination intensity of the media device within the first portion of the predetermined spectral range is increased over time.

20. The non-transitory computer-readable storage media of claim 13, the program code further configured to cause the one or more processors to:

detect that a user is viewing content on the media device at a page turn rate lesser than a predetermined rate, the detecting including determining a rate at which a user is turning virtual pages of the viewable content presented by the media device; and increase a rate at which the illumination intensity of the media device within the first portion of the predetermined spectral range of the intensity curve is decreased over time.

* * * * *